United States Patent [19]
Lausen et al.

[11] Patent Number: 5,694,238
[45] Date of Patent: Dec. 2, 1997

[54] DEVICE FOR INTERCONNECTING AN AMPLIFYING FIBER

[75] Inventors: Hans Lausen, Darmstadt, Germany; Lutz Bersiner, Hildesheim, Germany; Thomas Klein, Eppelborn, Germany

[73] Assignee: Robert Bosch GmbH, Stuttgart, Germany

[21] Appl. No.: 520,667

[22] Filed: Aug. 28, 1995

[30] Foreign Application Priority Data

Aug. 27, 1994 [DE] Germany ............... P 44 30 512.5

[51] Int. Cl.$^6$ ................ G02B 6/30; H01S 3/16
[52] U.S. Cl. ............. 359/341; 359/160; 359/177; 385/21
[58] Field of Search .................... 359/160, 117, 359/134, 177, 341; 385/14, 16, 21

[56] References Cited

U.S. PATENT DOCUMENTS

| | | | |
|---|---|---|---|
| 4,878,726 | 11/1989 | Fatehi | 359/177 |
| 5,128,801 | 7/1992 | Jansen et al. | 359/343 |
| 5,309,455 | 5/1994 | Adachi et al. | 385/16 |
| 5,500,756 | 3/1996 | Tsushana et al. | 359/177 |

FOREIGN PATENT DOCUMENTS

| | | |
|---|---|---|
| DE 36 16 841 A1 | 11/1987 | Germany . |
| EP 0 421 675 A2 | 4/1991 | Germany . |
| EP 0 454 865 A1 | 11/1991 | Germany . |
| EP 0 474 447 A1 | 3/1992 | Germany . |
| DE 43 33 502 A1 | 4/1994 | Germany . |
| DE 44 01 219 A1 | 7/1995 | Germany . |

OTHER PUBLICATIONS

L. Bersiner et al., "Crossbar Structures Of Integrated Optical Switching Arrays With Noninterferometric Switches", ECOC '93, pp 497–500.

L. Bersiner et al., "Versatile Nonblocking Integrated Optical Switching Arrays With Redundancy For Large Optical Switching Fabrics", EFOC '92, pp 411–414.

H. Lausen et al., "Pigtailed Thermo–Optic 1x2–Switch In Polymer: Design and Experimental Evaluation", EFOC&N '94, pp. 99–101.

K.J. Ebeling, "Integrierte Optik"(Integrated Optics), Springer Verlag Berlin, 1989, pp. 106–108.

"Fiber Optics Handbook", 2nd Ed., Hewlett Package, 1988, P.93–94.

T.K. Gustafson, et al., "Photonic Switching", Springer 1987, pp. 95–99.

H. Haferkorn, "Lexicon der Optik", VEB Bibliographisches Institut, Leipzig, 1988, pp. 213, 305.

W. Haist, "Optische Telekommunikationssyteme", Damm–Verlag KG, Gelsenkirchen–Buer, 1989, pp.105–107.

T.L. Koch et al., "Balanced Operation of a GaInAs/GaInAsp Multiple–Quantum–Well Integrated Heterodyne Receiver", IEEE Photonics Technology Letters, Vol. 2, No. 8, Aug. 1990, pp. 577–580.

W. Bambach et al., "DIAMANT –An Economic Solution for the Introduction of Digital Transmission of Analogue and Digital Audio and Video Channels",FITCE European Telecommunications Days 1993, Antwerp, August 29 –September 4, pp.107.

Young et al, Ieee Photonics Technol, Lett., vol. 4, #9, pp. 1046 –1048, 9/92; abst. only herewith.

(List continued on next page.)

*Primary Examiner*—Nelson Moskowitz
*Attorney, Agent, or Firm*—Kenyon & Kenyon

[57] ABSTRACT

An integrated optical circuit is described for coupling an optical fiber amplifier with two or four terminals in such a way that the optical fiber amplifier is supplied with optical signals in a prescribed direction, and the optical signals are coupled out to an optical network via a directed directional coupler. The necessary optical switches, couplers, terminals and light guides are integrated into the integrated optical circuit.

15 Claims, 4 Drawing Sheets

OTHER PUBLICATIONS

Bersiver et al, ECOC '93, 19th Europ. Conf. an Opt. Cormumic. Proc., pp. 497–500, vol. 2, 9/16/93, abst. herewith.

Lauser et al, 12th Comm. Conf. an Europ, Fiber Opt. Communic. and Networks Proc., pp.99–101, 6/21/94; abst. herewith.

Heenser et al., Elect. Lett., vol. 27, #19, pp. 1778–1779, 9/12/91, abst. herewith.

DEVICE FOR INTERCONNECTING AN AMPLIFYING FIBER

FIELD OF THE INVENTION

The present invention relates to a device for connecting an amplifying fiber to optical lines.

BACKGROUND INFORMATION

A device for interconnecting an amplifying fiber is described in an article by Barnbach et al. ("DIAMANT-An Economic Solution for the Introduction of Digital Transmission of Analog and Digital Audio and Video Signals", FITCE, European Tele Communications Days 1993, Antwerp, Aug. 29, 1993 to Sep. 4, 1993), in which up to four discrete switches are arranged which ensure that an amplifying fiber which is introduced into a ring system is always operated in the prescribed amplification direction independently of the transmission direction of the optical signals. The use of four optical switches requires a relatively large outlay of circuitry. In the case of the use of a dual ring line, either only a single optical switch is necessary—one amplifying optical fiber being arranged for each ring line allocated a transmission direction—or two discrete switches. The amplifying fiber and a connected pump laser represent a fiber amplifier. The fiber amplifier has a directional coupler which is used to launch or couple out signals for an optical network.

SUMMARY OF THE INVENTION

The present invention provides a device which by contrast to known devices has the advantage that the optical lines and the amplifying fiber are connected to an integrated optical circuit and that an optical directional coupler is integrated on the integrated optical circuit. The device of the present invention is reduced in size by the integration of the directional coupler. The use of an integrated optical circuit for interconnecting the amplifying fiber leads to a cost-effective design of the interconnection.

As a result of the integration of switches used for switching over the transmission direction, the device of the present invention can be designed to be even more compact and even more cost effective.

It is particularly advantageous to integrate a two-by-two switch as the switch. In this way, the functions of four discrete switches are represented in the form of a single component. This leads to a cost reduction and a further reduction in the overall size.

It is advantageous, furthermore, to connect the fiber amplifier to an integrated directional coupler and in this way to couple the data out of the ring system. The coupling-out is thus achieved without enlarging the integrated optical circuit. At the same time, the coupling of a data output is configured cost effectively.

An advantageous development of the device according to the present invention is achieved by integrating as the switch a one-by-two switch and a two-by-one switch via which two input lines and two output lines are connected to the optical fiber amplifier.

A further embodiment of the device according to the present invention is achieved by arranging two additional one-by-two switches which connect an input line and an output line to two two-by-one switches.

Yet a further advantageous embodiment of the device of the present invention entails connecting two input lines and two output lines via two two-by-two switches to two two-by-one switches. The most varied switching combinations of the input and output lines are rendered possible in this way. Consequently, the optical signals on a multiplicity of variants can be fed to the integrated optical circuit and output from the integrated optical circuit, while allowing the signals to be amplified and coupled-out in a simple way.

DETAILED DESCRIPTION OF THE DRAWINGS

Figure 1:
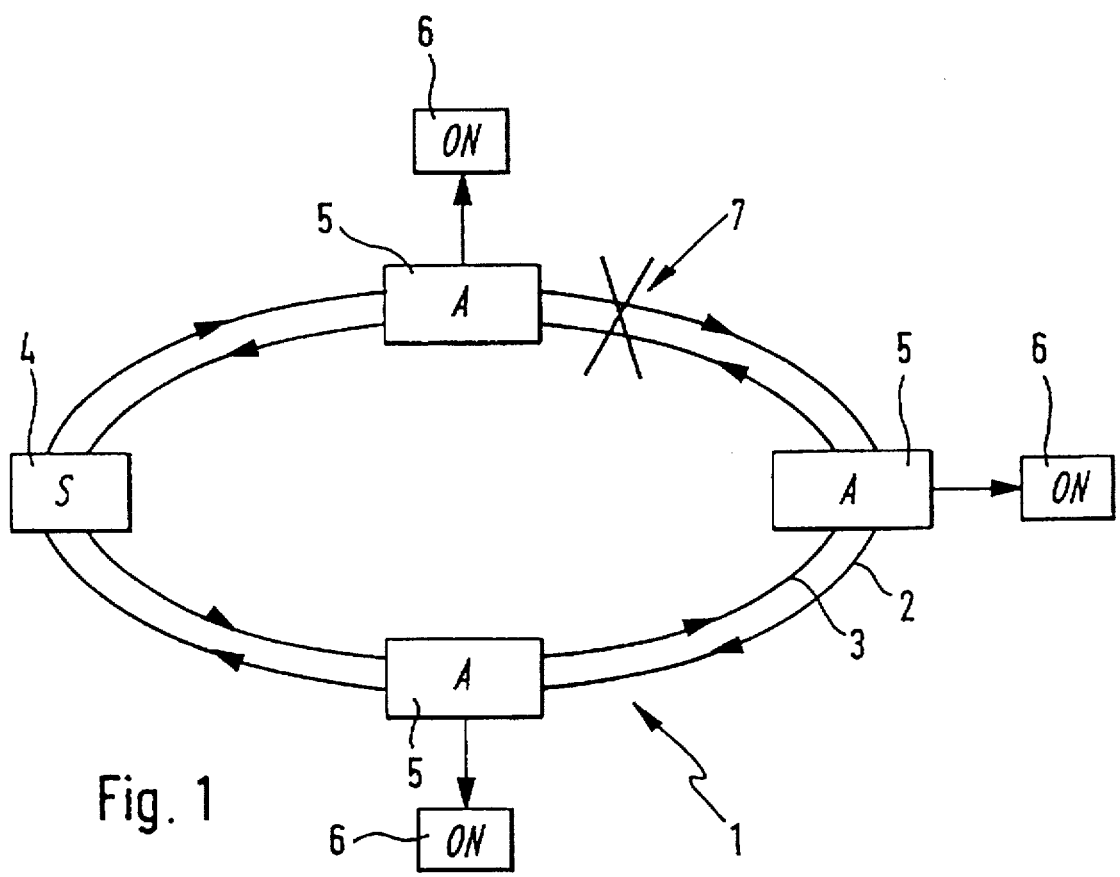
FIG. 1 is a schematic illustration of a fiber ring system.

FIG. 1 shows a fiber ring system comprising a transmitter 4 which is connected via two ring lines 2 and 3 to three taps 5. The ring lines 2 and 3 can be realized by means of one and the same optical fiber. The first ring line 2 transmits data in the form of optical signals in the clockwise direction. The signals are emitted in this case by the transmitter 4 in the clockwise direction and connected through, back up to the transmitter 4 via the three taps 5. In addition, the transmitter 4 can also send signals in the counter-clockwise direction via the second ring line 3. In this case, as well, the signals are connected through via the three taps 5 and returned to the transmitter 4.

The taps 5 amplify the signals by means of a directional fiber amplifier. By means of an optical directional coupler, each of the taps 5 duplicates the signals transmitted via the ring lines 2 and 3 and relays the signals to an optical network 6. The optical network 6 consists, for example, of a multiplicity of receiving devices such as television or radio sets.

If an interruption 7 occurs in the ring lines 2 and 3, the transmitter 4 no longer receives back the signals that it emits. If the transmitter 4 is not already sending signals in both directions, it is thereby prompted to send in both directions in order to reach all taps 5. Provision must therefore be made so that appropriate switching of the signal stream on the ring lines occurs in the taps 5 so that the signals are fed in the prescribed direction to the directional fiber amplifiers of the taps 5.

Figure 2:
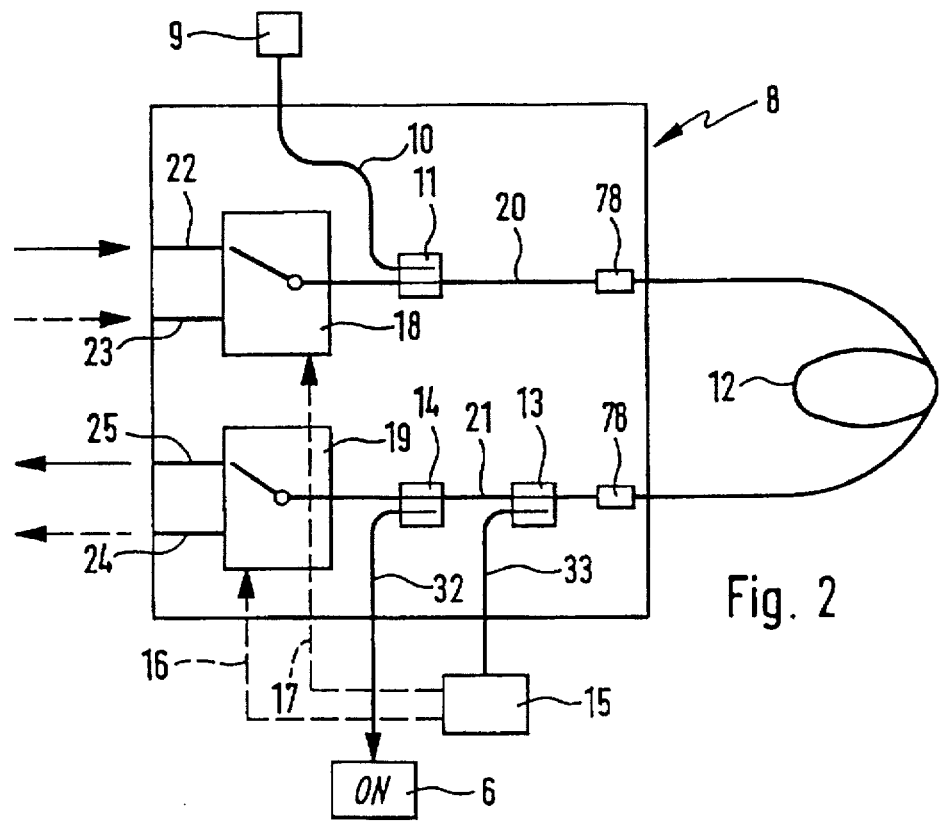
FIG. 2 illustrates an integrated optical circuit having a two-by-one switch and a one-by-two switch.

FIG. 2 shows an integrated optical circuit 8 in the form of an integrated chip having several integrated waveguides, including a first input line 22 and a second input line 23 which are led to respective inputs of a first switch 18 which is designed as a two-by-one switch. Coupled to the first and second input lines 22 and 23, respectively, are two optical lines such as ring lines 2 and 3 (FIG. 1). The optical lines are coupled to appropriately constructed terminals of the integrated optical circuit 8.

Integrated optical circuits are known and are produced, for example, in the form of a semiconductor chip having integrated optical waveguides, or in a moldable material with the aid of a molding technique, as described, for example, in German Published Patent Application No. 44 01 219 A1.

One output of the first switch 18 is coupled via a first input light guide 20 to a first end of an amplifying fiber 12, in particular having a fiber doped with erbium. A second end of the amplifying fiber 12 is connected to a first output light guide 21 which leads to an input of a second switch 19 which is designed as a one-by-two switch. The two outputs of the second switch 19 are connected to a first output line 24 and to a second output line 25. Optical lines, such as ring lines 2 and 3, are coupled to the first and the second output lines 24 and 25. The optical lines are connected to appropriately constructed terminals of the integrated optical circuit.

The amplifying fiber 12 is not integrated into the integrated optical circuit 8, but optically coupled to the integrated optical circuit via terminals of the integrated optical circuit. A pump laser 9 is likewise connected to the integrated optical circuit 8 and coupled via a first light guide 10 to a first wavelength-selective directional coupler 11. The first directional coupler 11 is coupled to the first input light guide 20 in such a way that the optical power output by the pump laser 9 is fed to the amplifying fiber 12.

Connected to the first output light guide 21 is a second directional coupler 13, which is connected via an output light guide 33 to a control unit 15 connected to the integrated optical circuit 8. A third directional coupler 14 is likewise connected to the first output light guide 21 and connected via a fourth output light guide 32 to an external optical network 6. The control unit 15 is connected via a first control line 16 to the second switch 19 and via a second control line 17 to the first switch 18. The pump laser 9, the optical network 6, the optical lines and the control unit 15 are optically coupled to the integrated optical circuit 8. The optical lines are represented diagrammatically in FIG. 2 in the form of arrows.

It is preferred to match the fields of the single-mode waveguides employed which have different core diameters. In the exemplary embodiment of FIG. 2, the amplifying fiber 12 is matched to the waveguides of the integrated optical circuit 8 via integrated tapers 78 for the purpose of generating an adiabatic transition. In this way, the loss in optical power during the transition between waveguides having different field distributions is minimized. Tapers are described, for example, in K. J. Ebeling, "Integrierte Optik" ("Integrated Optics"), Springer Verlag Berlin, 1989, pp. 106 et seq.

The operation of the arrangement illustrated in FIG. 2 will now be described.

An optical signal applied to the first input line 22 is led via the first input line 22 to the first switch 18 and via the first input light guide 20 to the amplifying fiber 12. The amplifying fiber 12 is supplied with pumping energy by the pump laser 9, with the result that the optical signal is amplified. The amplified optical signal is relayed by the amplifying fiber 12 via the second switch 19 to the second output line 25. In addition, the amplified optical power is relayed via the third optical directional coupler 14 to the optical network 6.

The control unit 15 is likewise fed, via the fifth output optical line 33, an optical signal dependent on the amplified optical signal. The control unit 15 checks whether an optical signal is being output by the amplifying fiber 12. If this is the case, the positions of the first and second switches 18 and 19 remain unchanged. If the monitoring in the control unit 15 indicates that no optical signal is being output by the amplifying fiber 12, the first switch 18 is switched over to the second input line 23 and the second switch 19 is switched over to the first output line 24. Thus, in the case of a failure of the first input line 22, a switch-over is made to the second input line 23. Likewise, a switch-over is made from the second output line 25 to the first output line 24. It is thus ensured, independently of the input line used, that the amplifying fiber 12, the first directional coupler 11, the second directional coupler 13 and the third directional coupler 14 are supplied with optical signals in the prescribed direction.

Optical fiber amplifiers having the associated directional couplers have already been disclosed such as the OFA 151 AB Fiber Amplifier manufactured by ANT, Bosch Telecom of Stuttgart, Germany, and described in brochure No. 018517, March 1994.

Likewise, optical switches having one-by-two, two-by-one and two-by-two configurations have been disclosed. A two-by-two optical switch is described, for example, in T. K. Gustafson et al., "Photonic Switching", Springer 1987, pp. 95 et seq.

Figure 3:
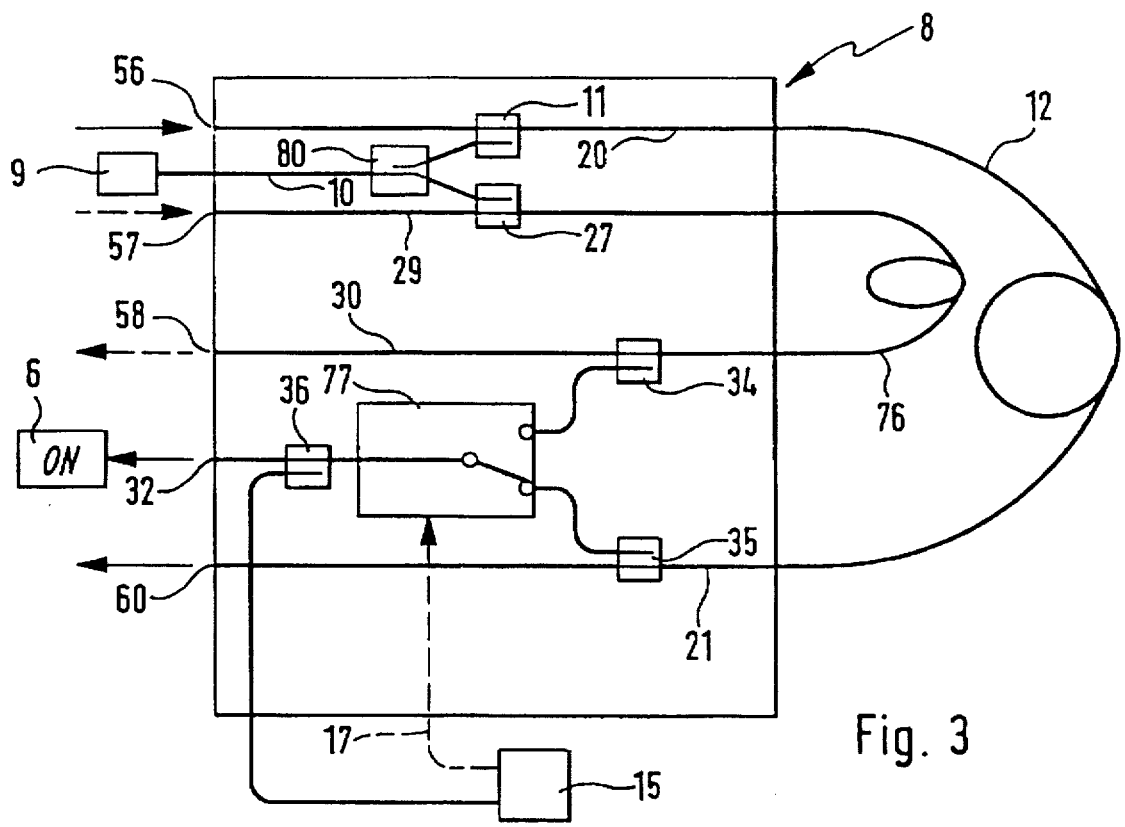
FIG. 3 illustrates an integrated optical circuit having a two-by-one output switch.

FIG. 3 shows an integrated optical circuit 8 which has first and second amplifying fibers 12 and 76. A third input 56 of the integrated optical circuit 8 is connected to the first input light guide 20, which is connected to one end of the first amplifying fiber 12. The second end of the first amplifying fiber 12 is connected to the first output light guide 21, which is led to a fifth output 60. A fourth input 57 is connected to a third input light guide 29 which is connected to the second amplifying fiber 76.

The output of the second amplifying fiber 76 is connected to a second output light guide 30, which is connected to a third output 58. The pump laser 9 is connected via a first light guide 10 and a distribution coupler 80 to a first directional coupler 11 and to a fifth directional coupler 27. The first directional coupler 11 is coupled to the first input light guide 20, and the fifth directional coupler 27 is coupled to the third input light guide 29. A sixth directional coupler 34 is coupled to the second output light guide 30 and is connected to a first input of a twelfth two-by-one switch 77.

A seventh directional coupler 35 is coupled to the first input light guide 21 and is connected to a second input of the twelfth switch 77. The output of the twelfth switch 77 is connected via a fourth output optical line 32 to an optical network 6. An eighth directional coupler 36 is connected to the fourth output light guide 32 and to a control unit 15. The control unit 15 is connected by a second control line 17 to the twelfth switch 77. Connected to the third and fourth inputs 56 and 57 and to the third and fifth outputs 58 and 60 are light guides which are used, for example, as ring lines. The light guides are represented diagrammatically as arrows in FIG. 3.

The operation of the arrangement of FIG. 3 will now be described.

An optical signal is led via the third input 56 to the first fiber 12, amplified by the pump laser 9 and output at the fifth output 60, with the coupling-out of the output signal to the optical network 6 being performed via the twelfth switch 77. If the control unit 15 establishes that no optical signal is being output at the output of the twelfth switch 77, the input of the twelfth switch 77 is switched over to the output of the second fiber 76. Thus, when an optical signal is no longer fed via the third input 56 and an optical signal is fed via the fourth input 57, coupling-out of the optical signal is switched over to the second fiber 76, and the optical network 6 thus continues to be supplied with optical signals.

Figure 4:
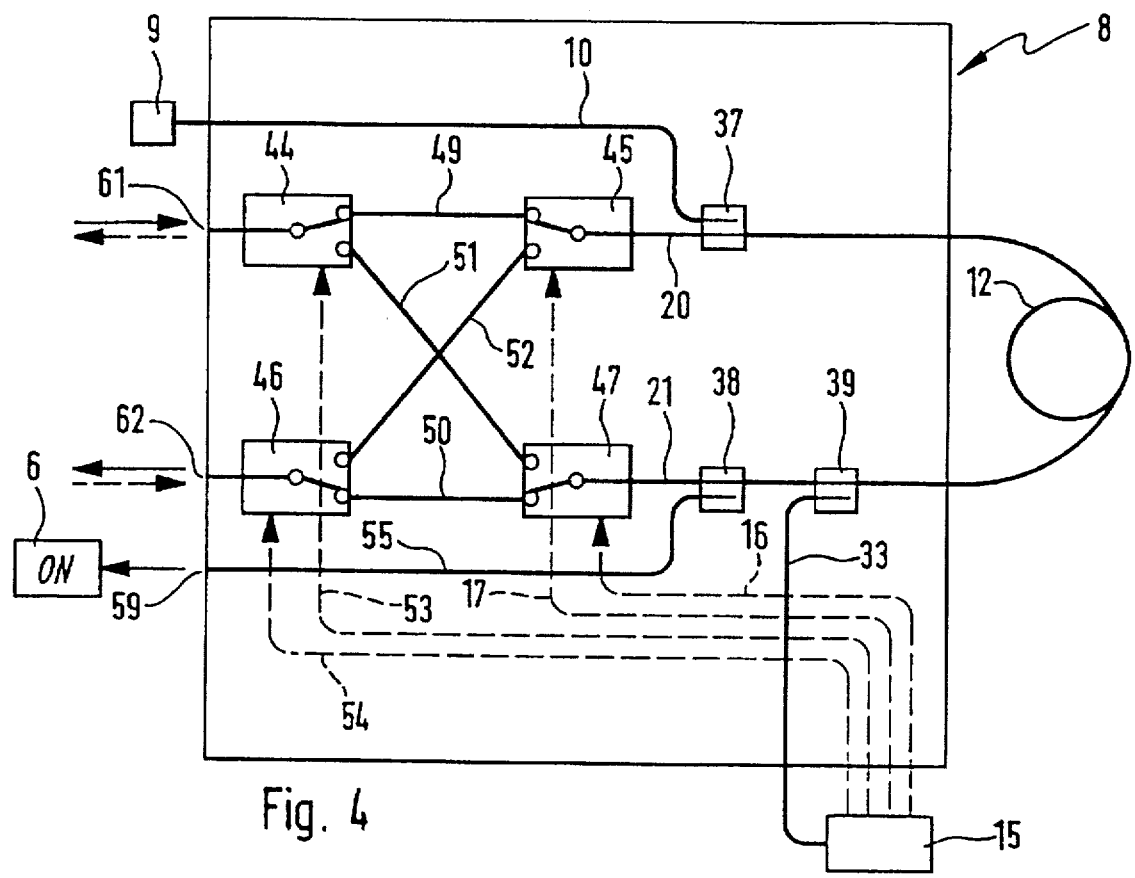
FIG. 4 shows an integrated optical circuit having four two-by-one switches.

FIG. 4 shows an integrated optical circuit 8 having four switches 44, 45, 46 and 47 and being coupled to an amplifying fiber 12. A first terminal 61 is connected to an input of a third switch 44. Depending on the operating direction, the third switch 44 is constructed as a one-by-two switch or as a two-by-one switch. One output of the third switch 44 is connected via a first connecting line 49 to an input of a fourth switch 45. The fourth switch 45 is constructed as a two-by-one switch. An output of the fourth switch 45 is connected via a first input light guide 20 to the amplifying fiber 12. A pump laser 9 is connected via a first light guide 10 to a ninth directional coupler 37 which is coupled to the first input light guide 20. The output of the amplifying fiber 12 is connected to a first output light guide 21, which is connected to an input of a sixth switch 47. The sixth switch 47 is constructed as a one-by-two switch.

An eleventh directional coupler 39 is coupled to the first output light guide 21 and connected via a fifth output optical line 33 to a control unit 15. A tenth directional coupler 38 is likewise coupled to the first output light guide 21, and is connected via a fifth output line 55 to an optical network 6. A first output of the sixth switch 47 is connected via a second optical connecting line 50 to a first input of a fifth switch 46. Depending on the operating direction, the fifth switch 46 is constructed as a two-by-one switch or as a one by-two switch. The output of the fifth switch 46 is connected to a second terminal 62. A second input of the fifth switch 46 is connected via a fourth optical connecting line 52 to a second input of the fourth switch 45. A second output of the third switch 44 is connected via a third optical connecting line 51 to a second output of the sixth switch 47. The control unit 15 is connected via a control line 53 to the third switch 44, a control line 17 to the fourth switch 45, a control line 54 to the fifth switch 46 and a control line 16 to the sixth switch 47. Optical lines, for example ring lines, are connected to the first and to the second terminals 61 and 62.

The arrangement depicted in FIG. 4 operates as follows. If an optical signal is applied to the integrated optical circuit 8 via the first terminal 61, the optical signal is led to the amplifying fiber 12 via the third and fourth switches 44 and 45 and the first input light guide 20. In the amplifying fiber 12, the pump laser 9 amplifies the optical signal fed. The amplifying fiber 12 sends an amplified optical signal to the second terminal 62 via the sixth switch 47 and the fifth switch 46. At the same time, the amplified optical signal of the amplifying fiber 12 is output to the optical network 6 via the tenth directional coupler 38.

The control unit 15 monitors the output of the amplifying fiber 12. If monitoring of the amplifying fiber 12 indicates that no optical signal is being output, the third switch 44, the fourth switch 45, the fifth switch 46 and the sixth switch 47 are switched over in such a way that optical signals which are applied via the second terminal 62 to the integrated optical circuit 8 are led to the first input light guide 20 via the fifth switch 46 and the fourth switch 45, and that optical signals amplified by the fiber 12 are output via the sixth switch 47 and the third switch 44 to the first terminal 61. In this way, although the optical signals are now fed via the second terminal 62 and are removed via the first terminal 61, the optical signals are amplified and coupled out to the optical network 6. Consequently, even in the case of a change in the data transmission direction, coupling out of the optical signals to the optical network 6 is maintained.

Figure 5:
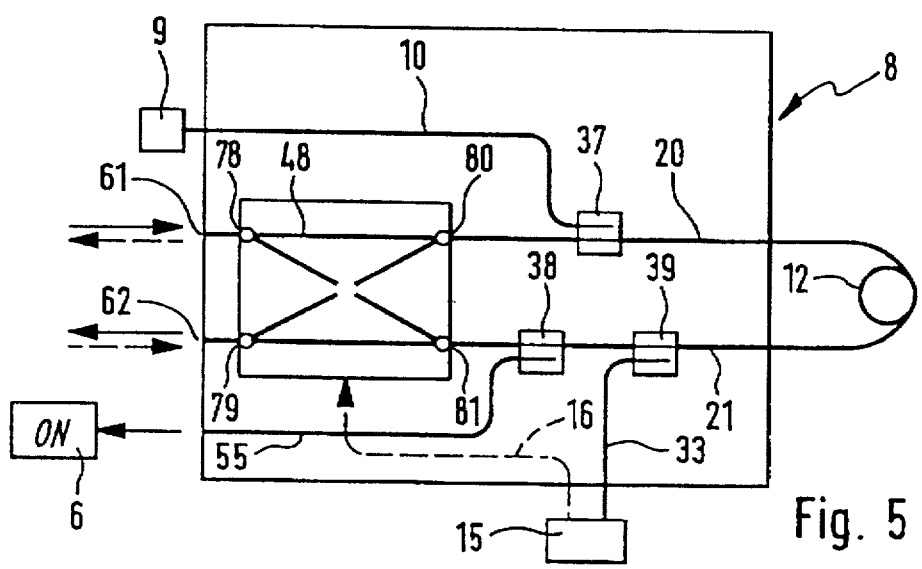
FIG. 5 shows an integrated optical circuit having a two-by-two switch.

FIG. 5 shows an integrated optical circuit 8 which has a seventh switch 48 which is constructed as a two-by-two switch. FIG. 5 corresponds essentially to FIG. 4 with the difference that a two-by-two switch 48 is used instead of the two one-by-two switches and the two two-by-one switches. A first input/output 78 of the seventh switch 48 is connected to the first terminal 61. A second input/output 79 of the seventh switch 48 is connected to the second terminal 62. A third input/output 80 of the seventh switch 48 is connected to the first input light guide 20. A fourth input/output 81 of the seventh switch 48 is connected to the first output light guide 21.

The pump laser 9 is coupled via the first light guide 10 and a ninth directed optical directional coupler 37 to the first input light guide 20. The first input light guide 20 is connected via the amplifying fiber 12 to the first output light guide 21. A control unit 15 is coupled to the first output light guide 21 via a fifth output optical line 33 and an eleventh directed optical directional coupler 39. An optical network 6 is coupled to the first output light guide 21 via a fifth output line 55 and a tenth directional coupler 38. Optical lines, in particular ring lines, are connected to the first and the second terminals 61 and 62. The optical lines are represented diagrammatically in the form of arrows.

The operation of the arrangement of FIG. 5 will now be described.

In an initial state, optical signals are led to the integrated optical circuit 8 via the first terminal 61. These signals are relayed via the seventh switch 48 to the first input light guide 20, amplified by means of the pump laser 9 and the amplifying fiber 12 and relayed via the first output light guide 21 and the seventh switch 48 to the second terminal 62. The amplified optical signals are led via the tenth optical directional coupler 38 and the fifth output line 55 to the optical network 6. If the monitoring of the output of the amplifying fiber 12 by the control unit 15 indicates that no output signal is being output, the seventh switch 48 is used to switch the first input light guide 20 to the second terminal 62 and the first output light guide 21 to the first terminal 61. It is thus achieved that although a reversal of the direction of signal transmission takes place, as in the case, for example, of a line interruption of a ring line, the signals nevertheless traverse the amplifying fiber 12 in the prescribed direction and are relayed to the optical network 6.

Figure 6:
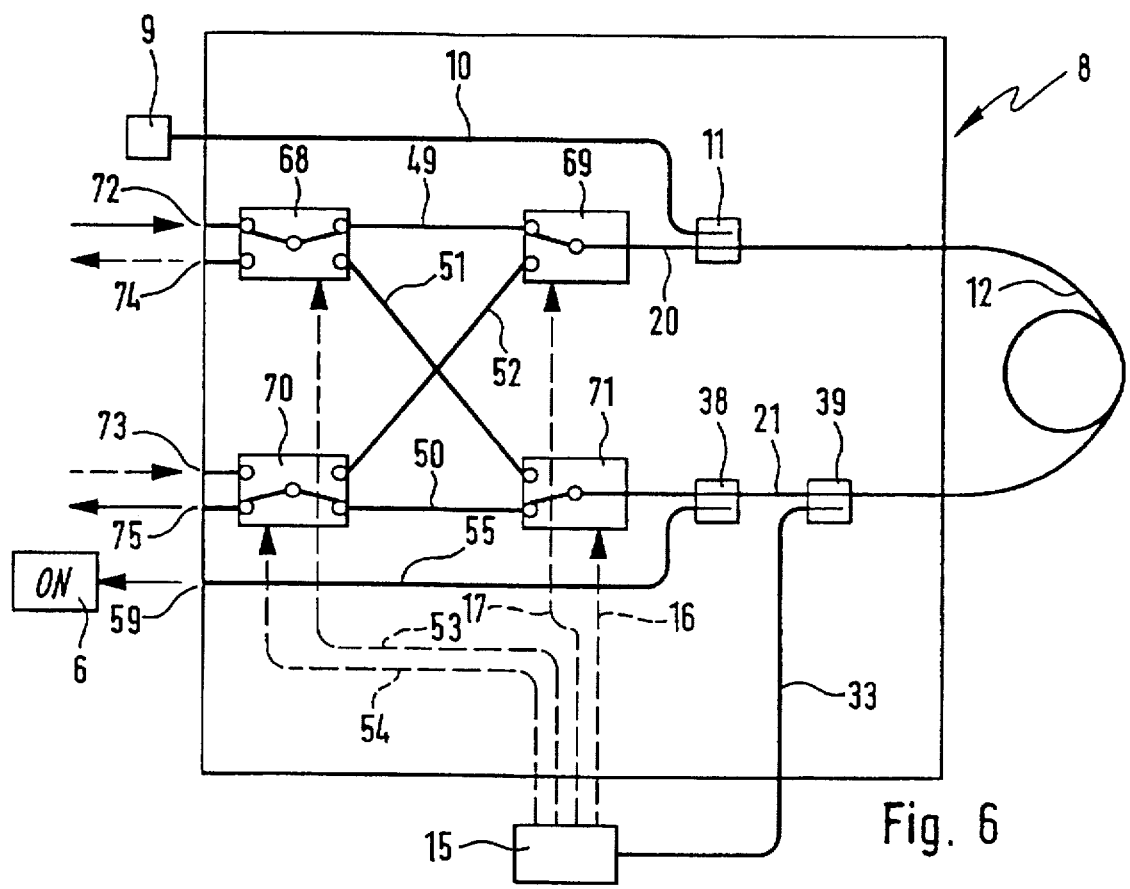
FIG. 6 shows an integrated optical circuit having two two-by-two switches and two two-by-one switches.

FIG. 6 shows an integrated optical circuit 8 which has two two-by-two switches 68 and 70 and, depending on the operating direction, two two-by-one switches or two one-by-two switches 69 and 71. An input 72 is connected to a first input of a two-by-two switch 68. A first output of the switch 68 is connected via a first optical connecting line 49 to a first input of a two-by-one switch 69. One output of the switch 69 is connected to the first input light guide 20.

The first input light guide 20 is led via an amplifying fiber 12 to a first output light guide 21, which is connected to a first input of a one-by-two switch 71. A first output of the switch 71 is connected via a second optical connecting line 50 to a first input of the switch 70, which, as mentioned, is constructed as a two-by-two switch. A first output of the switch 70 is connected to an output 75. A second input of the switch 70 is connected to an input 73. A second output of the switch 68 is connected to an output 74. A second input of the switch 68 is connected via a third optical connecting line 51 to a second output of the switch 71. A second output of the switch 70 is connected via a fourth optical connecting line 52 to a second input of the switch 69.

A pump laser 9 is coupled via a first light guide 10 and via a first directed optical directional coupler 11 to the first input light guide 20. A control unit 15 is connected via a fifth output optical line 33 to an optical directed directional coupler 39, which is coupled to the first output light guide 21. An optical directional coupler 38 is coupled to the first output light guide 21 and connected via a fifth output line 55 to an output 59 to which an optical network 6 is connected. The control unit 15 is connected via a fourth control line 54 to the switch 70, via a third control line 53 to the switch 68, via a second control line 17 to the switch 69, and via a first control line 16 to the switch 71. Optical lines, for example in the form of ring lines, are connected to the inputs 72 and 73 and to the outputs 74 and 75.

The arrangement of FIG. 6 functions as follows. An optical signal which is sent via the input 72 to the integrated optical circuit 8 is led via the switch 68 and the switch 69 to the first input light guide 20. The optical signal fed is amplified with the aid of the amplifying fiber 12 and the pump laser 9, and relayed via the switches 71 and 70 to the output 75. At the same time, the optical signal amplified by the amplifying fiber 12 is coupled out and relayed to the optical network 6.

The control unit 15 monitors the optical signal output by the amplifying fiber 12. In the event of an interruption of a ring line and a resultant reversal of transmission direction in which the optical signal is fed via the input 73, the control unit 15 establishes that no optical signal is present at the output of the amplifying fiber 12. The signal present at the input 73 is led via the fourth optical connecting line 52 to the second input of the switch 69. The control unit 15 switches over the switch 69 so that the optical signal present at its second input is relayed to the first input light guide 20. The optical signal fed is relayed to the input of the switch 71 by the first input light guide 20 and the amplifying fiber 12. The switch 71 is switched over by the control unit 15 in such a way that the optical signal present at its input is directed via its second output and the third optical connecting line 51 to a second input of the switch 68.

The switch 68 leads the optical signal present at its second input to the output 74 via its second output. In addition, the optical signal output by the amplifying fiber 12 is output via the directional coupler 38 and the fifth output line 55 to the output 59, which is connected to the optical network 6. It is thus achieved that the optical signals fed are coupled out to the optical network 6, even though the input 73 instead of the input 72 and the output 74 instead of the output 75 are used for the data signal transmission.

If the optical signals are applied to the output 75, the control unit 15 detects that no output signal is present at the amplifying fiber 12. Thereupon, the switches 70 and 69 are switched over in such a way that the signal fed via the output 75 is led to the first input light guide 20. At the same time, the switches 71 and 68 are switched over in such a way that the signal fed from the first output light guide 21 to the switch 71 is output via the input 72. Furthermore, arbitrary combinations of the optical signal guidance via the terminals 72, 73, 74 and 75 are possible, with the control unit 15 switching over the switches 68, 69, 70 and 71 in such a way that the optical signal fed is amplified and the amplified optical signals are coupled out to the optical network 6.

Figure 7:
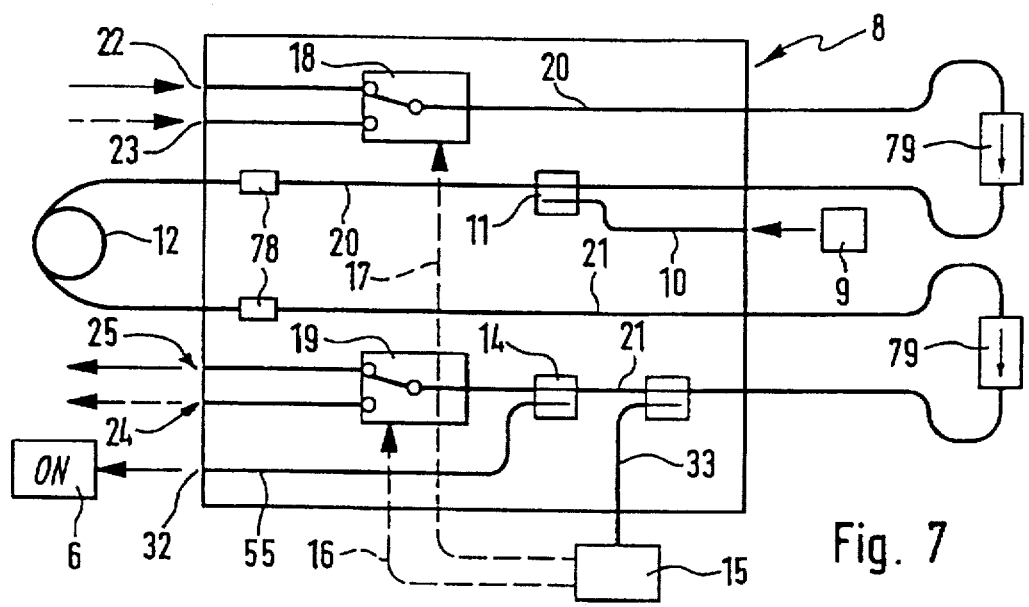
FIG. 7 shows an integrated optical circuit having isolators.

FIG. 7 shows a circuit 8 similar to the circuit of FIG. 2 modified so that an isolator 79 is switched into the signal path upstream of the amplifying fiber 12, and a further isolator 79 is switched into the signal path downstream of the amplifying fiber 12. The isolators 79 are of discrete design and optically coupled to the circuit 8. The isolators 79 are transparent to light only in one direction, which is indicated in FIG. 7 by an arrow. In this way, light is prevented from propagating against the prescribed operating direction of the fiber amplifier and impairment of the operating mode of the laser 9 and/or of the amplifying fiber 12 is prevented. Isolators are known and described, for example, in the "Fiber Optics Handbook", 2nd edition, Hewlett Packard, 1988, p. 93.

In a further embodiment of the device in accordance with the present invention, one or more amplifying fibers are co-integrated on the chip as amplifying waveguides. The optical isolators are likewise integrated directly on the chip. The light guides, directional couplers and switches drawn into the optical integrated circuit 8 in FIGS. 2 to 7 represent integrated components.

What is claimed is:

1. An integrated optical circuit for connecting at least two optical lines via at least one amplifying fiber, comprising:
   an integrated optical directional coupler;
   a plurality of integrated terminals; and
   a plurality of integrated light guides,
   wherein the integrated optical directional coupler is coupled via a first of the integrated light guides to a first of the integrated terminals for connecting to a pump laser, and via a second of the integrated light guides to a second of the terminals for connecting to a first end of the amplifying fiber, and
   wherein the integrated optical directional coupler is coupled to at least one further terminal for coupling to the optical lines.

2. An integrated optical circuit for connecting at least two optical lines via at least one amplifying fiber, comprising:
   an integrated optical directional coupler;
   a plurality of integrated terminals;
   a plurality of integrated light guides; and
   at least one optical switch,
   wherein the integrated optical directional coupler is coupled via a first of the integrated light guides to a first of the integrated terminals for connecting to a pump laser, and via a second of the integrated light guides to a second of the integrated terminals for connecting to a first end of the amplifying fiber, and wherein
   a third of the integrated terminals, for connecting to a first of the optical lines, is coupled to the optical directional coupler via the at least one optical switch,
   a fourth of the integrated terminals, for connecting to a second of the optical lines, is coupled, via the at least one optical switch, to a fifth of the integrated terminals for coupling to a second end of the amplifying fiber, and
   the third of the integrated terminals can be switched over by the at least one optical switch for coupling to the fifth of the integrated terminals and the fourth of the integrated terminals can be switched over by the at least one optical switch for coupling to the optical directional coupler.

3. The circuit according to claim 2, further comprising:
   a further optical directional coupler for coupling a monitoring device to the amplifying fiber; and
   at least one control line for coupling the monitoring device to the at least one integrated optical switch.

4. The circuit according to claim 2, wherein the at least one optical switch includes a two-by-two switch.

5. The circuit according to claim 2, further comprising a further directional coupler for coupling an output line to the fifth terminal.

6. An integrated optical circuit for connecting at least four optical lines via at least two amplifying fibers, comprising:
   a first integrated optical directional coupler;
   a plurality of integrated terminals;
   a plurality of integrated light guides;
   two further integrated optical directional couplers; and a two-by-one optical switch;

wherein the first integrated optical directional coupler is coupled via a first of the integrated light guides to a first of the integrated terminals for connecting to a pump laser, and via a second of the integrated light guides to a second of the integrated terminals for connecting to a first end of the first amplifying fiber, and wherein the plurality of integrated terminals further includes a fifth terminal for connecting to a second end of the amplifying fiber;

third and fourth terminals for respectively connecting to two of the optical lines;

sixth and seventh terminals for respectively connecting to two further optical lines;

eighth and ninth terminals for connecting to a second amplifying fiber; and wherein the second and fourth of the integrated terminals are coupled via respective integrated optical lines to the third and fifth of the integrated terminals, the sixth and seventh of the integrated terminals are coupled via respective integrated optical lines to the eighth and ninth of the integrated terminals, the two further integrated optical directional couplers are respectively coupled to the fifth and ninth of the integrated terminals and to inputs of the optical two-by-one switch, and an output of the two-by-one switch is coupled to an output line.

7. The circuit according to claim 6, further comprising:

a further optical directional coupler for coupling a monitoring device to the amplifying fiber; and at least one control line for coupling the monitoring device to the at least one integrated optical switch.

8. An integrated optical circuit for connecting at least four optical lines via at least one amplifying fiber, comprising:

an integrated optical directional coupler;

a plurality of integrated terminals; and a plurality of integrated light guides, wherein the integrated optical directional coupler is coupled via a first of the integrated light guides to a first of the integrated terminals for connecting to a pump laser, and via a second of the integrated light guides to a second of the integrated terminals for connecting to a first end of the amplifying fiber, and wherein the plurality of integrated terminals further includes third and fourth terminals for respectively connecting to two optical lines, a fifth terminal for connecting to a second end of the amplifying fiber, and sixth and seventh terminals for respectively connecting to two further optical lines, wherein the integrated optical circuit further includes an optical two-by-one switch with respective inputs coupled to the third and fourth of the integrated terminals and an output coupled to the directional coupler, and an optical one-by-two switch with an input coupled to the fifth of the integrated terminals and respective outputs coupled to the sixth and seventh of the integrated terminals.

9. The circuit according to claim 8, further comprising a further directional coupler for coupling an output line to the fifth terminal.

10. An integrated optical circuit for connecting at least two optical lines via at least one amplifying fiber, comprising:

an integrated optical directional coupler;

a plurality of integrated terminals; and a plurality of integrated light guides, wherein the integrated optical directional coupler is coupled via a first of the integrated light guides to a first of the integrated terminals for connecting to a pump laser, and via a second of the integrated light guides to a second of the integrated terminals for connecting to a first end of the amplifying fiber, and wherein the plurality of integrated terminals further includes third and fourth terminals for respectively connecting to two optical fibers, and a fifth terminal for connecting to a second end of the amplifying fiber, wherein the integrated optical circuit further comprises a first optical one-by-two switch with a first port coupled to the third of the integrated terminals, a first optical two-by-one switch with a first port coupled to the integrated optical directional coupler and a second port coupled to a second port of the first optical one-by-two switch, a second optical two-by-one switch with a first port coupled to the fourth of the integrated terminals and a second port coupled to a third port of the first optical two-by-one switch, and a second optical one-by-two switch with a first port coupled to the fifth of the integrated terminals, a second port coupled to a third port of the second optical two-by-one switch and a third port coupled to a third port of the first optical one-by-two switch, wherein the switches are controllable by a monitoring unit.

11. An integrated optical circuit for connecting at least four optical lines via at least one amplifying fiber, comprising:

an integrated optical directional coupler;

a plurality of integrated terminals; and a plurality of integrated light guides, wherein the integrated optical directional coupler is coupled via a first of the integrated light guides to a first of the integrated terminals for connecting to a pump laser, and via a second of the integrated light guides to a second of the integrated terminals for connecting to a first end of the amplifying fiber, and wherein the plurality of integrated terminals further includes third, fourth, sixth and seventh terminals for respectively connecting to optical fibers, and a fifth terminal for connecting to a second end of the amplifying fiber, wherein the integrated optical circuit further comprises a first optical two-by-two switch with a first port coupled to the third of the integrated terminals and a second port coupled to the fourth of the integrated terminals, an optical two-by-one switch with a first port coupled to the integrated optical directional coupler and a second port coupled to a third port of the first optical two-by-two switch, a second optical two-by-two switch with a first port coupled to the sixth of the integrated terminals, a second port coupled to the seventh of the integrated terminals and a third port coupled to a third port of the optical two-by-one switch, an optical one-by-two switch with a first port coupled to the fifth of the integrated terminals, a second port coupled to a fourth port of the second optical two-by-two switch and a third port coupled to a fourth port of the first optical two-by-two switch, wherein the switches are controllable by a monitoring unit.

12. The circuit according to claim 1, wherein at least one of the terminals includes a taper for matching different field distributions.

13. The circuit according to claim 1, further comprising terminals for coupling at least one optical isolator in series with the amplifying fiber.

14. The circuit according to claim 1, further comprising at least one optical isolator in series with the amplifying fiber.

15. The circuit according to claim 1, wherein the amplifying fiber is integrated into the circuit.

* * * * *